United States Patent
Aziz et al.

(10) Patent No.: US 10,257,329 B2
(45) Date of Patent: Apr. 9, 2019

(54) WIRELESS COMMUNICATIONS APPARATUS AND METHOD FOR PERFORMING LOW LATENCY HIGH THROUGHPUT LAYER 2 OPERATIONS

(71) Applicant: National Instruments Corporation, Austin, TX (US)

(72) Inventors: Ahsan Aziz, Austin, TX (US); Amal Ekbal, San Antonio, TX (US); Vincent Kotzsch, Dresden (DE)

(73) Assignee: National Instruments Corporation, Austin, TX (US)

( * ) Notice: Subject to any disclaimer, the term of this patent is extended or adjusted under 35 U.S.C. 154(b) by 13 days.

(21) Appl. No.: 15/700,050

(22) Filed: Sep. 8, 2017

(65) Prior Publication Data

US 2019/0082040 A1 Mar. 14, 2019

(51) Int. Cl.
*H04L 29/08* (2006.01)
*H04W 84/04* (2009.01)

(52) U.S. Cl.
CPC ......... *H04L 69/324* (2013.01); *H04W 84/042* (2013.01)

(58) Field of Classification Search
CPC ....... H04L 69/22; H04L 69/324; H04L 49/90; H04L 69/321; H04L 69/322; H04W 28/065; H04W 88/02; H04W 80/02
See application file for complete search history.

(56) References Cited

U.S. PATENT DOCUMENTS

| | | | | |
|---|---|---|---|---|
| 7,586,931 B2 * | 9/2009 | Qiu | .................. | H04L 1/0051 370/442 |
| 7,929,410 B2 * | 4/2011 | Hepler | .................. | H04L 49/90 370/208 |
| 8,270,428 B2 * | 9/2012 | Qui | .................. | H04L 1/0051 370/442 |

(Continued)

OTHER PUBLICATIONS

Kraft, "10 Gigabit Ethernet: Integrating a Standard Protocol into High-Speed Real-Time Systems" AdvancedIO Systems, Inc. Reprinted from RTC Apr. 2008, pp. 1-3.

(Continued)

*Primary Examiner* — Matthew C Sams
(74) *Attorney, Agent, or Firm* — E. Alan Davis; James W. Huffman

(57) ABSTRACT

A wireless communications apparatus includes first/second data source/sinks that respectively source/sink PDCP SDU and MAC PDU for transfer to/from a memory unit and hardware accelerators controlled by a control processor (CP). In response to sourcing transmit PDCP SDU for transfer to the memory unit, the CP controls the hardware accelerators to generate and write PDCP, RLC, MAC headers to the memory unit and assemble the generated headers and the transmit PDCP SDU from the memory unit into transmit MAC PDU for provision to the second data sink. In response to sourcing receive MAC PDU for transfer to the memory unit, the CP controls the hardware accelerators to decode PDCP, RLC MAC headers of the receive MAC PDU in the memory unit to determine locations of receive PDCP (Continued)

SDU in the memory unit and fetch the receive PDCP SDU from the determined locations for provision to the first data sink.

22 Claims, 4 Drawing Sheets

(56) References Cited

U.S. PATENT DOCUMENTS

| | | | | |
|---|---|---|---|---|
| 8,780,938 | B2* | 7/2014 | Lerzer | H04W 80/02 370/473 |
| 8,873,465 | B2* | 10/2014 | Qiu | H04L 1/0051 370/328 |
| 2007/0280158 | A1* | 12/2007 | Qiu | H04L 1/0051 370/329 |
| 2010/0177761 | A1* | 7/2010 | Qiu | H04L 1/0051 370/349 |
| 2010/0180006 | A1* | 7/2010 | Nourbakhsh | G06F 13/1663 709/213 |
| 2010/0274921 | A1* | 10/2010 | Lerzer | H04W 80/02 709/234 |
| 2010/0325393 | A1* | 12/2010 | Lerzer | H04L 1/1829 712/36 |
| 2016/0219481 | A1* | 7/2016 | Wang | H04W 28/085 |
| 2018/0103395 | A1* | 4/2018 | Gholmieh | H04L 1/1867 |
| 2018/0146467 | A1* | 5/2018 | Kim | H04W 72/0406 |
| 2018/0205808 | A1* | 7/2018 | Yang | H04L 69/324 |
| 2018/0206213 | A1* | 7/2018 | Kim | H04L 69/22 |

OTHER PUBLICATIONS

Rouwet, "QorIQ Qonverge Platform B4860 SoC L2/L3/Transport Partitioning and Key Performance Tips", Freescale, FTF Apr. 2014, pp. 1-65.

Szczesny, David et al. "Optimizing the Processing Performance of a Smart DMA Controller for LTE Terminals." The Sixteenth IEEE International Conference on Embedded and Real-Time Computing Systems and Applications. Aug. 23, 2010. pp. 309-315.

Samsung et al "Technical Analysis on the Benefit of Removing Concatenation." $3^{rd}$ Generation Partnership Project (3GPP) R2-168049. vol. RAN WG2. Nov. 13, 2016. Retrieved from the internet url: http://www.3gpp.org/ftp/meetings_3GPP_SYNC/RAN2/Docs/ retrieved on Nov. 13, 2016 pp. 1-4.

Qualcomm Incorporated et al. "U-plane Improvements for HW Friendly Implementations—UE TX Side." $3^{rd}$ Generation Partnership Project (3GPP). R2-165577 vol. RAN WG2. Aug. 21, 2016. pp. 1-5. Retrieved from the Internet: http://www.3gpp.org/ftp/Meetings_3GPP_SYNC/RAN2/Docs/ on Aug. 21, 2016.

Hessel, Sebastian et al. "Architectural Analysis of a Smart DMA Controller for Protocol Stack Acceleration in LTE Terminals." Vehicular Technology Conference Fall (VTC 2010—FALL), 2010 IEEE $72^{nd}$, IEEE. Sep. 6, 2010. pp. 1-5.

* cited by examiner

WIRELESS COMMUNICATIONS APPARATUS AND METHOD FOR PERFORMING LOW LATENCY HIGH THROUGHPUT LAYER 2 OPERATIONS

BACKGROUND

The latency requirements for the $5^{th}$ Generation (5G) New Radio (NR) standard promulgated by the 3rd Generation Partnership Project (3GPP) appear to be an order of magnitude more stringent than the Long Term Evolution (LTE) latency requirements. More specifically, the sub-frame time is expected to be reduced from 1 millisecond in LTE to orders of magnitude shorter sub-frame duration in new standards such as 5G NR. This may impose some serious demands on the processing requirements of cellular devices such as base stations and user equipment (UE) and traditional processing architectures may not be up to the task.

BRIEF SUMMARY

In some embodiments, an apparatus and method and non-transitory computer-readable medium having instructions stored thereon that are capable of causing or configuring a computing system to perform operations for use in performing wireless communications includes at least one memory unit, a first data source/sink that sources/sinks packet data convergence protocol (PDCP) service data units (SDU) for transfer to/from the memory unit, and a second data source/sink that sources/sinks media access control (MAC) protocol data units (PDU) for transfer to/from the memory unit, a plurality of hardware accelerators coupled to the memory unit, and a control processor that controls the plurality of hardware accelerators. In response to the first data source sourcing one or more transmit PDCP SDU for transfer to the memory unit, the control processor controls the plurality of hardware accelerators to generate and write PDCP, radio link control (RLC), and MAC headers to the memory unit and assemble the generated PDCP, RLC and MAC headers and the one or more transmit PDCP SDU from the memory unit into one or more transmit MAC PDU for provision to the second data sink. In response to the second data source sourcing one or more receive MAC PDU for transfer to the memory unit, the control processor controls the plurality of hardware accelerators to decode PDCP, RLC and MAC headers of the one or more receive MAC PDU in the memory unit to determine locations of one or more receive PDCP SDU in the memory unit and fetch the one or more receive PDCP SDU from the determined locations in the memory unit for provision to the first data sink.

The control processor may be uncoupled from the at least one memory unit that holds the PDCP SDU. The control processor may control the plurality of hardware accelerators without reading/writing PDCP SDU from/to the memory unit.

The control processor may provide to the plurality of hardware accelerators pointers to locations of the memory unit from which the plurality of hardware accelerators assemble the one or more transmit MAC PDU and fetch the one or more receive PDCP SDU.

The control processor may receive from the plurality of hardware accelerators pointers to locations of the memory unit of the one or more receive PDCP SDU in response to the decode of the headers of the one or more receive MAC PDU.

The control processor may receive from the plurality of hardware accelerators pointers to locations of the memory unit of the written headers.

The control processor may provide to the plurality of hardware accelerators pointers to locations of the memory unit to which the plurality of hardware accelerators write the generated headers.

The control processor may receive from the plurality of hardware accelerators pointers to locations of the memory unit of the one or more receive PDCP SDU in response to the decode of the headers of the one or more receive MAC PDU.

The control processor and the plurality of hardware accelerators may communicate regarding locations of the memory unit to which the plurality of hardware accelerators write the generated headers.

The apparatus may also include a second memory that is coupled to the control processor and uncoupled from the plurality of hardware accelerators and that holds code executed by the control processor to perform PDCP, RLC and MAC sub-layer procedures.

The control processor may store in the second memory PDCP, RLC and MAC procedure state and pointers to locations of the headers and the PDCP SDU in the memory unit that the control processor provides to and receives from the plurality of hardware accelerators.

The PDCP SDU may be internet protocol (IP) packets.

The MAC PDU may be PHY transport blocks (TB).

The apparatus may also include a reset input to reset the control processor in response to an error condition.

The plurality of hardware accelerators may have a common programming interface programmable by the control processor.

The control processor may have a plurality of interfaces respectively coupled to the plurality of hardware accelerators to control the plurality of hardware accelerators.

The one or more memory units may include a first memory unit that receives the PDCP SDU sourced from the first data source and a second memory unit that receives the MAC PDU sourced from the second data source.

The plurality of hardware accelerators may be configurable by the control processor to operate in distinct transmit and receive modes.

The control processor may control the plurality of hardware accelerators by performing pointer manipulations to perform one or more of the following without itself reading/writing the PDCP SDU from/to the memory unit: packet retransmission window management, packet segmentation, packet concatenation and packet discard.

The wireless communications may be according to at least one of the following list of wireless communication standards defined by the 3rd Generation Partnership Project (3GPP) and Institute of Electrical and Electronics Engineers (IEEE): Long Term Evolution (LTE), LTE-Advanced, LTE-Advanced Pro, 3GPP NR and IEEE 802.11.

DETAILED DESCRIPTION OF THE EMBODIMENTS

Acronyms

Figure 1:
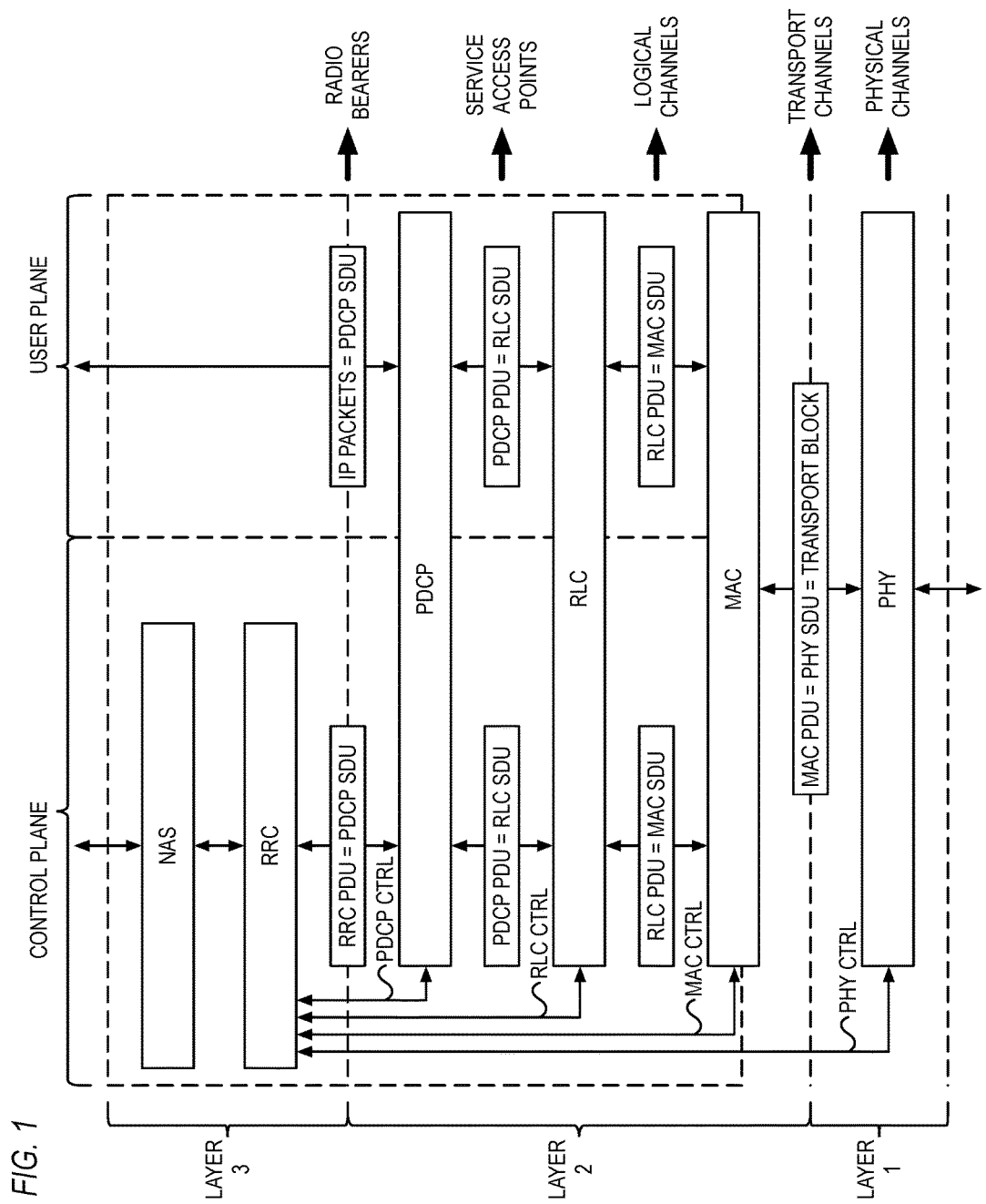
FIG. 1 is a block diagram illustrating a protocol stack used in a LTE network.

5G—5$^{th}$ Generation
AM—Acknowledged Mode
API—Application Programming Interface
ARQ—Automatic Repeat Request
ASIC—Application Specific Integrated Circuit
AXI—Advanced eXtensible Interfaces
BRAM—Block Random Access Memory
CRC—Cyclic Redundancy Code
DRAM—Dynamic Random Access Memory
eNB—Evolved Node B, or eNodeB
gNB—next Generation Node B, or gNodeB
FPGA—Field Programmable Gate Array
HARQ—Hybrid Automatic Repeat Request
IP—Internet Protocol
L1—Layer 1
L2—Layer 2
L3—Layer 3
LTE—Long Term Evolution
MAC—Medium Access Control
NAS—Non-Access Stratum
NR—New Radio
PDCP—Packet Data Convergence Protocol
PDCCH—Physical Downlink Control Channel
PDU—Protocol Data Unit
PHY—Physical Layer
RLC—Radio Link Control
ROHC—Robust Header Compression
RRC—Radio Resource Control
RX—receive
SDU—Service Data Unit
SOC—System On Chip
TB—transport block
TM—Transparent Mode
TX—transmit
UE—User Equipment
UM—Unacknowledged Mode
VOIP—Voice over IP It should be understood that capitalized acronyms may designate singular or plural quantities of the specified entity depending upon the context. For example, PDCP SDU may designate a single PDCP SDU or multiple PDCP SDU, depending upon the context.

The embodiments described below, in particular the partitioning of the processing workload at the PDCP and MAC sublayers of L2 for a wireless communication device (e.g., UE or eNB or gNB), are advantageously configured to meet the high data throughput and low latency requirements of the 3GPP 5G standards, for example, and similar and increased demands by future standards that will inevitably ensue. The embodiments include a main processor, referred to as a control processor, that controls the L2 processes and procedures. The control processor has a memory from which it fetches programs to execute and which stores the associated data used by the programs, e.g., L2 procedure parameters and state. The embodiments also include one or more dedicated memories, i.e., separate from the control processor memory, that serve as buffers of the incoming and outgoing packets and generated/decoded headers and serve as a component of TX and RX data paths for the packets and headers. The embodiments also include hardware accelerators that offload the control processor by performing various operations traditionally performed by the control processor. Such operations in the TX path include the placement of PDCP SDU from the L3 into the dedicated buffer memory, PDCP/RLC/MAC header generation and assembling the generated headers and PDCP SDU from the dedicated buffer memory into MAC PDU for provision to the L1. Such operations in the RX path include the placement of the MAC PDU from the L1 into the dedicated buffer memory, PDCP/RLC/MAC header decoding, and PDCP SDU fetching from the decoded locations in dedicated buffer memory for provision to the L3. The hardware accelerators perform their operations under the control of the control processor. A result of this combination is that, advantageously, the packets do not flow through the control processor, but instead flow through the TX/RX data paths, thus alleviating the control processor from having to move the packet data and headers from the L1 to the L3 and vice versa and facilitating low latency and high data throughput. First, a framework in which the L2 processing apparatus and method may operate will be described.

Referring now to FIG. 1, a block diagram illustrating a protocol stack used in a LTE network is shown. The protocol stack includes three layers: Layer 1 (L1), Layer 2 (L2) and Layer 3 (L3). The L1 includes the physical layer (PHY) that performs physical layer functions. The L2 includes three sub-layers: Packet Data Convergence Protocol (PDCP) sub-layer, Radio Link Control (RLC) sub-layer and Media Access Control (MAC) sub-layer. The L3 includes two functional layers: Non-Access Stratum (NAS) and Radio Resource Control (RRC). The L3 and L2 of the stack are vertically subdivided into a control plane and a user plane. The control plane includes the L3 NAS and RRC as well as the L2 PDCP, RLC, and MAC sub-layers. The user plane includes the L2 PDCP, RLC, and MAC sub-layers.

The NAS protocol establishes communication sessions and maintains communications between UE and the core network as the UE move, e.g., from one cell to another. The NAS transparently passes messages through the radio network between the UE and nodes of the core network to request service, attach and authenticate. Once the UE establishes a radio connection, the UE uses the radio connection to communicate with the core nodes to coordinate service.

The RRC protocol handles radio-specific functions depending upon whether the UE is idle or connected. When in idle mode, the UE considers radio link quality, cell status and radio access technology factors, monitors a paging channel to detect incoming calls and acquire system information, and performs cell selection and reselection procedures. When in connected mode, the UE supplies downlink channel quality and neighbor cell information to enable selection of the most suitable cell for the UE. The RRC protocol functions also include system information broadcast, RRC connection control, mobility procedures, security activation and transfer of context information. As shown, the RRC also is involved in the control of the PDCP, RLC, MAC and PHY.

The PDCP functions include header compression/decompression for user plane data packets (e.g., using Robust Header Compression (ROHC)), handover management which includes re-ordering and sequencing of PDUs during cell-to-cell handover, and encryption and decryption services (e.g., SNOW 3G or AES-128) for control and user plane data as well as integrity protection and verification of control pane data. As shown, the PDCP interfaces logically with the L3 via radio bearers. More specifically, signaling radio bearers between the PDCP and RRC and data radio bearers between the PDCP and the user plane portion of the L3. The unit of communication between the PDCP and L3 is a PDCP SDU, which is an Internet Protocol (IP) packet in the case of a user data radio bearer and which is an RRC PDU in the case of an RRC signaling radio bearer.

The RLC functions include reformatting PDCP PDU to fit the size required by the MAC layer transport block (TB) in the transmit direction. This involves segmentation (i.e., breaking up a PDCP PDU into multiple PDCP PDU) and concatenation (joining multiple PDCP PDU into a single PDU). The TB size may depend upon bandwidth requirements, distance, power requirements, modulation scheme and type of application. An RLC PDU can be the product of both segmentation and concatenation. RLC functions also include reconstructing the PDCP PDU in the receive direction. Other RLC functions include duplicate packet detection, packet discarding and packet re-ordering. The RLC also re-orders packet received out of sequence. As shown, the RLC interfaces logically with the PDCP via service access points. The unit of communication between the RLC and PDCP is a RLC SDU, which is PDCP PDU. The RLC transmits data in three modes: Transparent Mode (TM), Unacknowledged Mode (UM), and Acknowledged Mode (AM). TM maps, or passes through, RLC SDU to RLC PDU and vice versa without modifying the packets or adding overhead. UM involves adding/removing the packet header and may involve buffering, segmentation, concatenation and re-ordering. In contrast to AM, UM does not provide packet acknowledgement and therefore does not provide the same error correction capabilities of AM, but also is not hampered by the need for acknowledgements. Hence, UM is useful for traffic requiring relatively small latency such as Voice over IP (VOIP). AM includes an Automatic Repeat Request (ARQ) feature that retransmits data to correct erroneous packets. AM is useful for traffic that is error sensitive traffic that can tolerate delays such as web browsing. AM allows bidirectional data transfer.

The MAC functions include scheduling, which distributes the available bandwidth among the active UE in the cell, random access procedure control used by the UE to access and synchronize with the network, and uplink timing alignment. Another MAC function is Hybrid Automatic Repeat Request (HARD) operation that retransmits and combines received transport blocks and generates ACK or NACK signaling in case of a cyclic redundancy code (CRC) failure. The MAC layer maps the RLC data received through the logical channels to transport channels that connect the MAC with the PHY, which in turn communicates via physical channels wirelessly with other devices/nodes on the wireless network. A MAC TB is sent in a radio sub-frame, which in LTE is 1 millisecond, but may be orders of magnitude shorter in newer standards such as 5G NR. As shown, MAC and RLC may communicate via logical channels. The unit of communication between the MAC and RLC is a MAC SDU, which is RLC PDU. The unit of communication between the PHY and the MAC is a PHY SDU, which is a MAC PDU, which is a TB.

Figure 3:
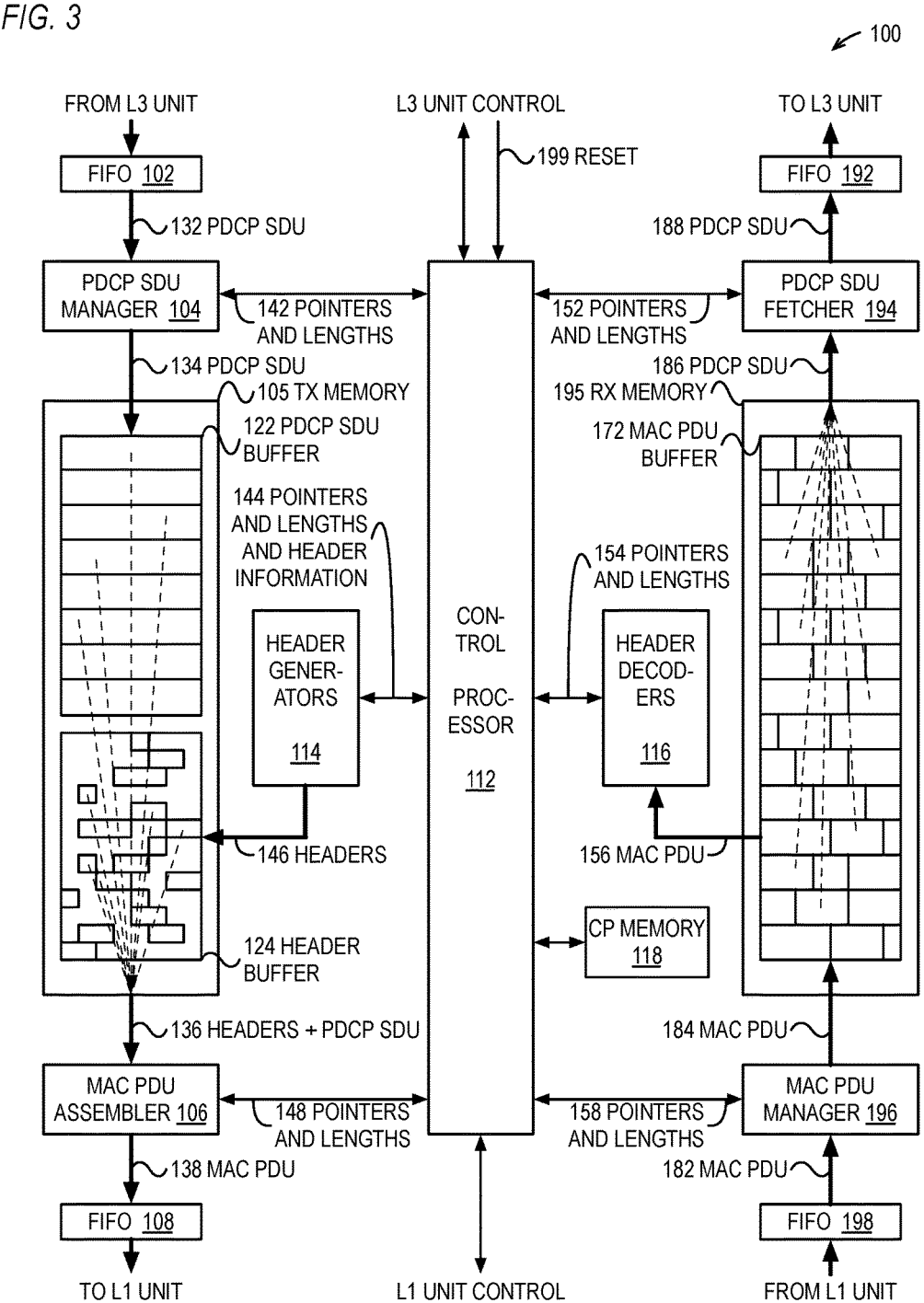
FIG. 3 is a block diagram illustrating an apparatus for performing wireless communications and, more specifically, for performing operations associated with L2 processing, including PDCP, RLC and MAC sub-layer processing.

Although FIG. 1 describes an LTE protocol stack to provide an example of a framework in which the apparatus 100 of FIG. 3 may operate, it should be understood that the apparatus 100 may be included in wireless communication devices (e.g., UE, eNB, gNB) that employ other protocol stacks that have PDCP and MAC at their L2 boundaries with an intervening RLC, such as LTE-A, LTE-A Pro and the 5G standard defined by 3GPP, as well as the IEEE 802.11 standard. The most recent version of the LTE-A Pro standard is Release 14 frozen as of Jun. 9, 2017. The first version of the 3GPP 5G standard will be Release 15 scheduled to be frozen Sep. 14, 2018.

Figure 2:
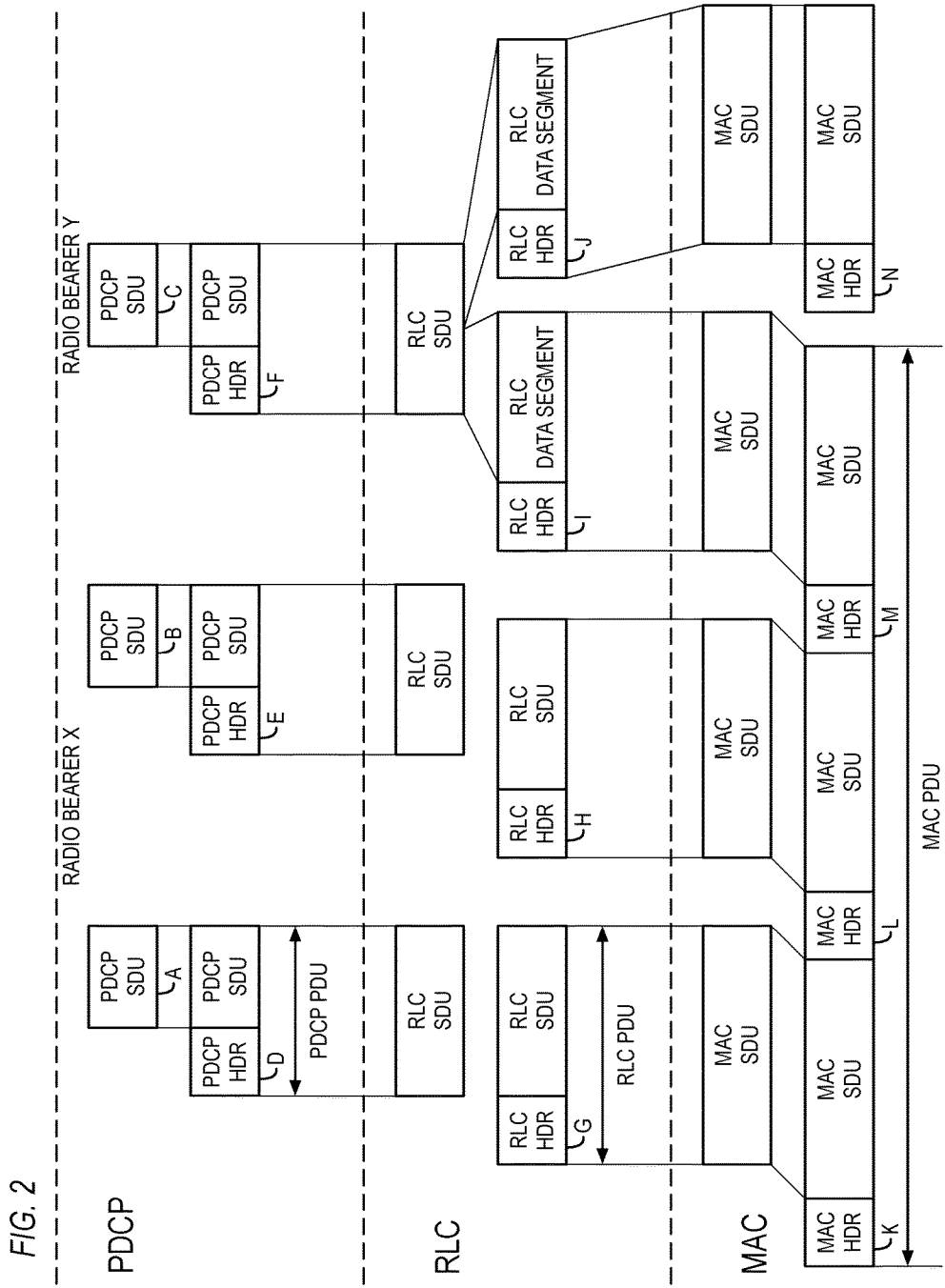
FIG. 2 is a block diagram illustrating the various packets formed and decoded in the Layer 2 (L2), or more specifically, in the Packet Data Convergence Protocol (PDCP), Radio Link Control (RLC) and Media Access Control (MAC) sub-layers.

Referring now to FIG. 2, a block diagram illustrating the various packets formed and decoded in the L2, or more specifically, in the PDCP, RLC and MAC sub-layers is shown. FIG. 2 illustrates the reception of three PDCP SDU, two provided by a radio bearer X and denoted PDCP SDU A and B, and a third provided by radio bearer Y and denoted PDCP SDU C.

The PDCP sub-layer generates three PDCP headers D, E and F, which it respectively prepends to PDCP SDU A, B and C, to form three PDCP PDU. The three PDCP PDU are shown received into the RLC sub-layer as three RLC SDU. In the example, the RLC segments the third RLC SDU into two separate RLC data segments because the scheduled TB size could not fit three full RLC packets. The RLC sub-layer generates four RLC headers G, H, I and J, which it respectively prepends to the two RLC SDU and the two RLC data segments to form four RLC PDU. The four RLC PDU are shown received into the MAC sub-layer as four MAC SDU. The MAC sub-layer generates four MAC headers K, L, M and N, which it respectively prepends to the four MAC SDU. The MAC sub-layer concatenates the first three results to form a first MAC PDU, and header N prepended to the fourth MAC SDU forms a second MAC PDU.

Although composition, or generation, of the various packets was just described as may occur in the transmit direction, a decomposition, or decoding, may be performed in a reverse fashion in the receive direction. That is, the MAC sub-layer may receive and decode a first MAC PDU from the L1 that includes three MAC SDU and their associated pre-pended MAC headers (K, L, M) and decompose it into three MAC SDU for provision as three RLC PDU to the RLC sub-layer; and receive and decode a second MAC PDU from the L1 that includes one MAC SDU and its associated pre-pended MAC header (N) and decompose it into a fourth MAC SDU for provision as a fourth RLC PDU to the RLC sub-layer. The RLC sub-layer may decode and decompose each of the first and second RLC PDU into first and second RLC SDU. The third and fourth RLC PDU each contain a respective RLC data segment. The RLC sub-layer may concatenate the third and fourth RLC PDU into a third RLC SDU. The three RLC SDU may be provided to the PDCP sub-layer as three PDCP PDU. Finally, the PDCP sub-layer may decode and decompose the three PDCP PDU into three respective PDCP SDU. FIG. 2 will be referred to below to illustrate operation of the apparatus 100 of FIG. 3 to process packets.

Referring now to FIG. 3, a block diagram illustrating an apparatus 100 for performing wireless communications is shown. More specifically, the apparatus 100 performs operations associated with L2 processing, including PDCP, RLC and MAC processing. Preferably, the apparatus 100 may be employed in a wireless device such as a UE or base station (e.g., eNB, gNB) conforming to the LTE, LTE-Advanced, LTE-Advanced Pro or 5G NR standards defined by 3GPP. Additionally, the apparatus 100 may be employed in a wireless device such as a wireless router, access point, smart phone, tablet, mobile device, laptop, desktop, personal computer, or other device confirming to an Institute of Electrical and Electronics Engineers (IEEE) 802.11 standard.

The apparatus 100 includes a first data source/sink that sources PDCP SDU 132 received from a L3 unit (not shown) and sinks PDCP SDU 188 to the L3 unit. The L3 unit includes circuitry that performs the L3 functions, e.g., one or more processors and software executed by the processors to perform the L3 functions. In one embodiment, the first data source comprises a first-in-first-out (FIFO) memory 102 that receives the PDCP SDU from the L3 unit, and the first data sink comprises a FIFO memory 192 that provides the PDCP SDU to the L3 unit. However, the first data source/sink may be other structures such as registers, a random access memory (RAM) or a bus coupled to the L3 unit. The L3 unit may include a 10 Gigabit Ethernet port or similar high speed data port as its transport mechanism that writes the FIFO 102 with transmit data and reads receive data from the FIFO 108. In one embodiment, the PDCP SDU are IP packets.

The apparatus 100 also includes a second data source/sink that sources MAC PDU 182 received from a L1 unit (not shown) and sinks MAC PDU 138 to the L1 unit. The L1 unit includes the circuitry that performs the PHY functions, e.g., signal processing circuitry, radio circuitry and antennas. In one embodiment, the second data source comprises a FIFO memory 198 that receives the MAC PDU from the L1 unit, and the second data sink comprises a FIFO memory 108 that provides the MAC PDU to the L1 unit. However, the second data source/sink may be other structures such as registers, a RAM or a bus coupled to the L1 unit. In one embodiment, the MAC PDU are PHY TB, e.g., specified by 3GPP LTE, LTE-A, 5G NR or IEEE 802.11.

The apparatus 100 also includes a PDCP SDU manager 104, a TX memory 105, a MAC PDU assembler 106, a control processor 112, header generators 114, header decoders 116, a control processor memory 118, a MAC PDU manager 196, a RX memory 195, and a PDCP SDU fetcher 194. A portion of the TX memory 105 is allocated as a PDCP SDU buffer 122 and another portion of the TX memory 105 is allocated as a header buffer 124. A portion of the RX memory 195 is allocated as a MAC PDU buffer 172.

The TX memory 105, RX memory 195 and control processor memory 118 may be any of various memory types, including but not limited to, dynamic random access memory (DRAM) or Block RAM (BRAM). A BRAM is a type of random access memory that is embedded throughout an FPGA for data storage and may be used to transfer data between multiple clock domains, between an FPGA target and a host processor, or between FPGA targets. The TX memory 105 and RX memory 195 are used to hold transmit and receive packet data, respectively, as described in more detail below, and advantageously serve as temporary storage buffers through which the packets may flow without being read or written by the control processor 112. PDCP, RLC and MAC headers are generated and written into the TX memory 105 and decoded from the RX memory 195 without the control processor 112 writing/reading the TX/RX memory 105/195. The control processor memory 118 holds code executed by the control processor 112 and data processed by the control processor 112. Preferably, the control processor memory 118 is dedicated to the control processor 112 to facilitate high performance and deterministic operation of the control processor 112 to meet stringent latency and data throughput requirements, such as those imposed by the mm wave 5G NR standard.

The apparatus 100 is generally arranged as a TX data path and a RX data path. The TX data path includes the FIFO 102, the PDCP SDU manager 104, the TX memory 105, the MAC PDU assembler 106, the FIFO 108 and the header generators 114. The RX data path includes the FIFO 198, the MAC PDU manager 196, the RX memory 195, the PDCP SDU fetcher 194, the FIFO 192 and the header decoders 116. Advantageously, although the control processor 112 controls the PDCP SDU manager 104, header generators 114, and MAC PDU assembler 106 to accomplish processing of packets through the TX data path and controls the MAC PDU manager 196, header decoders 116, and PDCP SDU fetcher 194 to accomplish processing of packets through the RX data path, the packets do not pass through the control processor 112. That is, the control processor 112 does not read/write packet data or headers from/to the TX memory 105 and RX memory 195.

Figure 4:
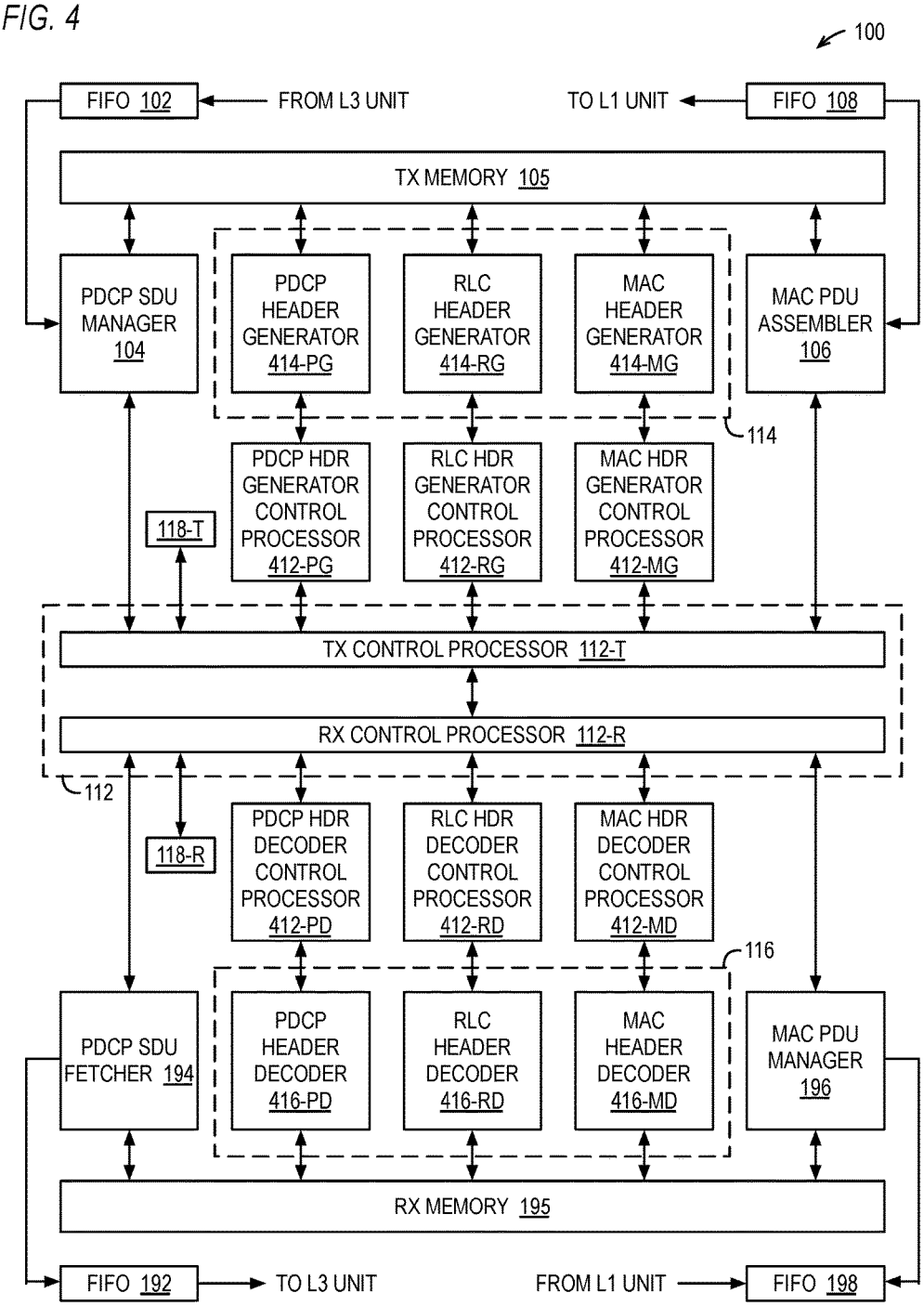
FIG. 4 is a block diagram illustrating an alternate embodiment of the apparatus of FIG. 3.

Instead, the PDCP SDU manager 104, header generators 114, MAC PDU assembler 106, MAC PDU manager 196, header decoders 116, and PDCP SDU fetcher 194 perform the packet movement under the supervision of the control processor 112. With this architecture, the control processor 112 is advantageously offloaded to more efficiently and deterministically perform the L2 operations, e.g., the PDCP, RLC and MAC operations, as described in more detail below, to achieve low latency and high data throughput. In one embodiment, the apparatus 100 includes two instances of the control processor 112, one to control the TX data path (e.g., the PDCP SDU manager 104, header generators 114 and MAC PDU assembler 106) and one to control the RX data path (e.g., the MAC PDU manager 196, header decoders 116 and PDCP SDU fetcher 194) as shown in FIG. 4.

The PDCP SDU manager 104, header generators 114, MAC PDU assembler 106, MAC PDU manager 196, header decoders 116, and PDCP SDU fetcher 194 are hardware accelerators that perform the various tasks described herein to offload the control processor 112. A hardware accelerator is hardware circuitry that performs one or more operations in response to inputs and is distinct from the control processor. The hardware circuitry includes a combination of combinatorial logic, sequential logic, state machines and/or storage elements. For example, the hardware accelerators may be implemented in an FPGA (included with or separate from the control processor), an application specific integrated circuit (ASIC), or as part of a system on chip (SOC). The hardware accelerators are programmable by the control processor. In one embodiment, the hardware accelerators have a defined application programming interface (API) by which the control processor may send instructions, or opcodes and operands, to the hardware accelerators to perform the operations. In one embodiment, the hardware accelerators all have the same API, and the control processor sends different opcodes and operands to the different hardware accelerators to control them to perform the different operations described. In one embodiment, various of the hardware accelerators are programmable by the control processor 112 to operate in distinct TX and RX modes to perform operations associated with the TX data path (e.g., header generation, packet gathering) in the TX mode and other operations associated with the RX data path (e.g., header decoding, packet fetching) in the RX mode.

The control processor 112 receives pointers to and/or lengths of packets, packet headers and packet data from the PDCP SDU manager 104, header generators 114, header decoders 116 and/or MAC PDU manager 196 as input; additionally, the control processor 112 also provides pointers to and/or lengths of packets, packet headers and packet data to the MAC PDU assembler 106, header generators 114, header decoders 116 and/or PDCP SDU fetcher 194, as described in more detail below. The control processor 112 also accepts and provides parameters that control the states of the PDCP SDU manager 104, MAC PDU assembler 106, header generators 114, header decoders 116, MAC PDU manager 196 and PDCP SDU fetcher 194. The control processor 112 also computes, manages and maintains state variables, pointers and related parameters such as window lengths, timers, etc. to control L2 processes and procedures of the PDCP, RLC and MAC sub-layers. The control processor 112 controls various PDCP, RLC and MAC sub-layer processes and procedures including, but not limited to, packet retransmissions, packet retransmission window management, packet concatenation, packet segmentation, and MAC control and scheduling. In one embodiment, the control processor 112 comprises a Microblaze microprocessor core running at 175 MHz and implemented within a Field Programmable Gate Array (FPGA) and designed by Xilinx, Inc. of San Jose, Calif., which may be described in the Microblaze Processor Reference Guide, 2016.3 UG984 (v2016.3) Oct. 5, 2016, although other embodiments are contemplated that use other processors. The control processor 112 receives a reset input 199 which the L3 unit may assert to reset the control processor 112 in response to an error condition, such as a radio link failure or other error conditions. The control processor 112 also communicates with the L1 unit control and L3 unit control plane.

In one embodiment, the control processor 112 includes a dedicated interface (or port, or link, or bus) to each of the hardware accelerators, e.g., PDCP SDU manager 104, header generators 114, MAC PDU assembler 106, MAC PDU manager 196, header decoders 116, and PDCP SDU fetcher 194. An advantage of the dedicated interfaces is that write or read operations by the control processor 112 to/from the hardware accelerators may complete immediately without contention with other agents. This may be superior to a conventional design in which the processor accesses the memory that contains the packets in which case the processor must contend with other agents trying to access the memory. The lack of contention may improve the efficiency of the control processor 112 as well as make the L2 sublayer procedure processing time by the control processor 112 more deterministic, which may be important to meeting the quality of service requirements of demanding standards such as the 3GPP 5G cellular device standards, including the L2 portion. In one embodiment, the dedicated ports are Advanced eXtensible Interfaces (AXI), for example as described in the Xilinx AXI Reference Guide, UG761 (v14.3) Nov. 15, 2012, and that appeared in the Advanced Microcontroller Bus Architecture (AMBA) 3 specification supported by Advanced RISC Machines (ARM), Ltd. of Cambridge, England.

The operation of the apparatus 100 to transmit data through its TX data path portion and to receive data through its TX data path portion will now be described separately.

TX Data Path Operation

When the PDCP SDU manager 104 detects the presence of a PDCP SDU in the FIFO 102, it reads the PDCP SDU 132 from the FIFO 102 and writes the PDCP SDU 134 to a location in the PDCP SDU buffer 122 and notifies the control processor 112. The control processor 112 receives the length of the PDCP SDU, either from the PDCP SDU manager 104 or from the L3 unit transport mechanism (e.g., 10 Gb Ethernet port or similar high speed data port) that writes the PDCP SDU into the FIFO 102. In one embodiment, the L3 unit transport mechanism determines the length of the PDCP SDU (e.g., if the PDCP SDU is an IP packet, the L3 unit knows the length of the IP packet, which may be determined from the IP packet header) and provides the PDCP SDU length to the control processor 112 and/or to the PDCP SDU manager 104. The PDCP SDU manager 104 reads words from the FIFO 102 (e.g., in 4-byte words) and provides addresses to the TX memory 105 along with the words read from the FIFO 102 to write the words to the TX memory 105. In one embodiment, the control processor 112 manages the PDCP SDU buffer 122. The control processor 112 provides the PDCP SDU manager 104 with pointers 142 to locations in the PDCP SDU buffer 122 into which the control processor 112 wants the PDCP SDU manager 104 to write the PDCP SDU. In another embodiment, the PDCP SDU manager 104 manages the PDCP SDU buffer 122 and provides to the control processor 112 pointers 142 to locations in the PDCP SDU buffer 122 into which the PDCP SDU manager 104 has written the PDCP SDU. For example, in one embodiment the PDCP SDU manager 104 has its own BRAM into which it writes PDCP SDU and from which the MAC PDU assembler 106 reads them. In yet another embodiment, the location to which the PDCP SDU manager 104 writes the next PDCP SDU is known by both the PDCP SDU manager 104 and control processor 112 by convention. For example, the PDCP SDU buffer 122 is managed as a circular buffer in which the PDCP SDU manager 104 and control processor 112 maintain pointers initialized to the same location at initialization of the apparatus 100 and which they update each time the PDCP SDU manager 104 writes a PDCP SDU. In such a circular buffer embodiment, the pointers may be updated by the length of the written PDCP SDU. Alternatively, the circular buffer is managed as an array of entries of fixed length that is the maximum length of a PDCP SDU, and the PDCP SDU manager 104 and control processor 112 update their pointers by the maximum length.

The control processor 112 keeps track of the locations of the various valid PDCP SDU in the PDCP SDU buffer 122 and uses this information to provide pointers and lengths 148 to the MAC PDU assembler 106 when a MAC PDU is ready to be written to the FIFO 108, as described in more detail below. By keeping track of the PDCP SDU locations, the control processor 112 is also able to perform packet retransmissions, packet segmentations, packet concatenations and packet discards.

As the PDCP SDU are received in the PDCP SDU buffer 122, the control processor 112 controls the header generators 114 to generate and write to the header buffer 124 the PDCP, RLC and MAC headers 146 necessary to form MAC PDU. The header generators 114 provide addresses to the TX memory 105 that specify the locations of the various words of the headers 146 to be written. In one embodiment, the control processor 112 provides pointers 144 to the header generators 114 that specify the locations within the header buffer 124 to which the header generators 114 are to write the headers 146. Additionally, the control processor 112 provides the information to the header generators 114 that they need to generate the headers 146. In an alternate embodiment (e.g., in which the header buffer 124 is a dedicated BRAM), the header generators 114 manage the header buffer 124 and provide to the control processor 112 pointers to and lengths of 144 the written headers 146. Subsequently, the control processor 112 provides the location of the generated headers as pointers 148 to the MAC PDU assembler 106, as described in more detail below. More specifically, the control processor 112 controls the header generators 114 to generate: (1) PDCP headers that may be pre-pended to PDCP SDU to form PDCP PDU, which are RLC SDU; (2) RLC headers that may be pre-pended to RLC SDU to form RLC PDU, which are MAC SDU; and (3) MAC headers that may be pre-pended to MAC SDU to form MAC PDU, which are PHY SDU or TB. Furthermore, the control processor 112 may control the header generators 114 (e.g., by providing pointers and header information 144) to generate the headers 146 that may be read, along with the PDCP SDU, by the MAC PDU assembler 106 to accomplish packet segmentation, packet concatenation, packet retransmission and window management according to the different L2 processes. In one embodiment, there are separate header generators 114 for generating PDCP headers, RLC headers and MAC headers. Advantageously, the header generators 114 offload a significant amount of computation required to generate the headers (e.g., data alignment and bit manipulations that require significant amounts of shifts and Boolean logic operations) that would otherwise have to be performed by the control processor 112. Additionally, the amount of generated header bytes that must be written to the TX memory 105 may be significant, which the control processor 112 does not have to perform.

After the necessary headers 146 are written into the header buffer 124, the control processor 112 controls the MAC PDU assembler 106 to read from the PDCP SDU buffer 122 and header buffer 124 particular headers and PDCP SDU 136 whose locations and lengths are specified by pointers and lengths 148 the control processor 112 provides to the MAC PDU assembler 106. The MAC PDU assembler 106 uses the pointers and lengths 148 to generate TX memory 105 read addresses to form MAC PDU 138 that the MAC PDU assembler 106 writes to the FIFO 108, preferably words (e.g., 4-byte words) at a time. For example, using the example of the MAC PDU shown in FIG. 2, after the three PDCP SDU in the first row of the Figure (A, B, C) have been written by the PDCP SDU manager 104 to the PDCP SDU buffer 122, the control processor 112: (1) controls the header generators 114 to generate the three corresponding PDCP headers (D, E, F) in the second row of the Figure and write them to the header buffer 124; (2) controls the header generators 114 to generate the four RLC headers (G, H, I, J) in the fourth row of the Figure (one each associated with the two Radio bearer X RLC SDU and one each associated with the two data segments of the Radio bearer Y RLC SDU) and write them to the header buffer 124; and (3) controls the header generators 114 to generate the four MAC headers (K, L, M, N) associated with the four MAC SDU in the sixth row of the Figure and write them to the header buffer 124. The control processor 112 then provides to the MAC PDU assembler 106 pointers 148 to the various generated headers and PDCP SDU and their associated lengths so that the MAC PDU assembler 106 can assemble the MAC PDU by reading the appropriate addresses from the TX memory 105 based on the provided pointers and lengths 148 and writing the words read therefrom to the FIFO 108. More specifically, the control processor 112 specifies the order in which the various headers and PDCP SDU are to be read from the TX memory 105 and written to the FIFO 108 to properly form the MAC PDU, namely: K, G, D, A, L, H, E, B, M, I, F, C, and the length provided along with the pointer to C would be less than the entire length of C, whereas the lengths provided with the pointers to the other headers/PDCP SDU would be their entire length.

The presence of the MAC PDU in the FIFO 108 (e.g., non-empty indicator) may serve as an indication to the L1 unit that it may read the MAC PDU from the FIFO 108 for transmission on the wireless channel by the radios of the PHY and the antennas connected thereto. In one embodiment, the MAC PDU assembler 106 provides the length of the MAC PDU to the L1 unit.

RX Data Path Operation

When the MAC PDU manager 196 detects the presence of a MAC PDU in the FIFO 198, it reads the MAC PDU 182 from the FIFO 198 and writes the MAC PDU 184 to a location in the MAC PDU buffer 172 and notifies the control processor 112. The MAC PDU manager 196 reads words from the FIFO 198 (e.g., in 4-byte words) and provides addresses to the RX memory 195 along with the words read from the FIFO 198 to write the words to the RX memory 195. In one embodiment, the control processor 112 manages the MAC PDU buffer 172. The control processor 112 provides the MAC PDU manager 196 with pointers 158 to locations in the MAC PDU buffer 172 into which the control processor 112 wants the MAC PDU manager 196 to write the MAC PDU. In another embodiment, the MAC PDU manager 196 manages the MAC PDU buffer 172 and provides to the control processor 112 pointers 158 to locations in the MAC PDU buffer 172 into which the MAC PDU manager 196 has written the MAC PDU. For example, in one embodiment the MAC PDU manager 196 has its own BRAM into which it writes MAC PDU and from which the PDCP SDU fetcher 194 reads them. In yet another embodiment, the location to which the MAC PDU manager 196 writes the next MAC PDU is known by both the MAC PDU manager 196 and control processor 112 by convention. For example, the MAC PDU buffer 172 is managed as a circular buffer in which the MAC PDU manager 196 and control processor 112 maintain pointers initialized to the same location at initialization of the apparatus 100 and which they update each time the MAC PDU manager 196 writes a MAC PDU. In such a circular buffer embodiment, the pointers may be updated by the length of the written MAC PDU. The control processor 112 may know the length of the MAC PDU a priori. For example, assume the apparatus 100 is included in a base station (e.g., eNB, gNB) of a cellular network. The cellular network is a centralized system in which the MAC scheduler operation decides the amount of resources (e.g., data and time) and configuration (e.g., data rate) assigned to each UE device and application. Therefore, at each radio frame slot the control processor 112 knows the length to expect in the transmissions and receptions with each UE/application it communicates with. Furthermore, assuming the apparatus 100 is included in a UE, the base station uses the control channel (e.g., Physical Downlink Control Channel (PDCCH)) to deliver the schedule to each relevant UE. Typically, each UE decodes the information sent via the PDCCH by the base station at the beginning of each slot or sub-frame and learns about the PHY parameters it needs to set itself to and the time/frequency/duration/PDU length that it was assigned. Alternatively, the circular buffer is managed as an array of entries of fixed length that is the maximum length of a MAC PDU, and the MAC PDU manager 196 and control processor 112 update their pointers by the maximum length.

The control processor 112 keeps track of the locations of the various valid MAC PDU in the MAC PDU buffer 172 and uses this information to provide pointers and lengths 154 to the header decoders 116. Additionally, the control processor 112 may provide to the header decoders 116 information needed to decode the headers. The header decoders 116 responsively decode the PDCP, RLC and MAC headers of MAC PDU 156 to determine the locations within the PDCP SDU buffer 122 of the individual PDCP SDU within the MAC PDU. The header decoders 116 provide to the control processor 112 the pointers and lengths 154 of the PDCP SDU in the MAC PDU buffer 172. The header decoders 116 may also provide to the control processor 112 additional information decoded from the headers. The process of determining the PDCP SDU locations may be a multi-step process between the control processor 112 and the header decoders 116. For example, using the example of the MAC PDU shown in FIG. 2, the control processor 112 and header decoders 116 may perform a similar process but in reverse. The control processor 112 may provide the pointer and length 154 of the MAC PDU to the header decoders 116. The header decoders 116 may decode the MAC headers K, L, M, N and provide the control processor 112 with the pointers and lengths 154 of their respective MAC SDU. The control processor 112 may then provide the pointers and lengths 154 of the four MAC SDU to the header decoders 116. The header decoders 116 may responsively decode RLC headers G, H, I and provide the control processor 112 with the pointers and lengths 154 of their respective RLC SDU. The control processor 112 may then provide the pointers and lengths 154 of the three RLC SDU to the header decoders 116. The header decoders 116 may responsively decode PDCP headers D, E, F and provide the control processor 112 with the pointers and lengths 154 of their respective PDCP SDU A, B, C. The control processor 112 may then provide the pointers and lengths 152 of the three PDCP SDU A, B, C to the PDCP SDU fetcher 194. In response, the PDCP SDU fetcher 194 may fetch the three PDCP SDU A, B, C and write them to the FIFO 192.

The presence of the PDCP SDU in the FIFO 192 may serve as an indication to the L3 unit that it may read the PDCP SDU from the FIFO 192, e.g., for provision to the user plane as IP packets or to the RRC as RRC PDU. In one embodiment, the PDCP SDU fetcher 194 provides the length of the PDCP SDU to the L3 unit. In one embodiment, there are separate header decoders 116 for decoding PDCP headers, RLC headers and MAC headers. Advantageously, the header decoders 116 offload a significant amount of computation required to decode the headers that would otherwise have to be performed by the control processor 112. Additionally, the amount of header bytes that must be read from the RX memory 195 may be significant, which the control processor 112 does not have to perform.

Referring now to FIG. 4, a block diagram illustrating an alternate embodiment of the apparatus 100 of FIG. 3 is shown. The apparatus 100 of FIG. 4 is similar in many respects to the apparatus 100 of FIG. 3 and like-numbered elements are similar. However, the apparatus 100 of FIG. 4 includes additional control processors to further scale the L2 processing load to accomplish potentially lower latency for packets through the L2. First, the control processor 112 of FIG. 3 comprises two control processors 112-T and 112-R to control the transmit and receive data paths, respectively. The control processors 112-T and 112-R are in communication with one another to coordinate performance of the L2 processes and procedures.

In the transmit path, the header generators 114 of FIG. 3 are shown in FIG. 4 as three distinct hardware accelerators: a PDCP header generator 414-PG, a RLC header generator 414-RG and a MAC header generator 414-MG each coupled to the TX memory 105. The additional control processors 412 include a PDCP header generator control processor 412-PG that controls the PDCP header generator 414-PG, a RLC header generator control processor 412-RG that controls the RLC header generator 414-RG, and a MAC header generator control processor 412-MG that controls the MAC header generator 414-MG. The PDCP header generator control processor 412-PG, the RLC header generator control processor 412-RG, and the MAC header generator control processor 412-MG are all controlled by the transmit path control processor 112-T.

In the receive path, the header decoders 116 of FIG. 3 are shown in FIG. 4 as three distinct hardware accelerators: a PDCP header decoder 416-PD, a RLC header decoder 416-RD and a MAC header decoder 416-MD each coupled to the TX memory 105. The additional control processors 412 include a PDCP header decoder control processor 412-PD that controls the PDCP header decoder 416-PD, a RLC header decoder control processor 412-RD that controls the RLC header decoder 416-RD, and a MAC header decoder control processor 412-MD that controls the MAC header decoder 416-MD. The PDCP header decoder control processor 412-PD, the RLC header decoder control processor 412-RD, and the MAC header decoder control processor 412-MD are all controlled by the receive path control processor 112-R.

In addition to controlling the header generators 114 and header decoders 116 to generate and decode packet headers, the additional control processors 412 may offload from the control processors 112-T and 112-R some of the PDCP, RLC and MAC sub-layer processes and procedures, such as packet retransmissions, packet retransmission window management, packet concatenation, and/or packet segmentation.

Advantageously, the embodiments described herein may reduce the L2 processing latency for the following reasons. First, the PDCP SDU and MAC PDU are placed into the dedicated temporary memory buffers (e.g., TX memory 105 and RX memory 195) upon entry into the L2 apparatus via dedicated data paths that do not go through the control processor. Second, data pointer manipulations are performed without moving the data to transmit and receive the data and to manage data retransmission windows, re-arrangements, concatenations or discarding of packets. Third, dedicated locations in the memory are provided to store processed headers that are ready to get concatenated to appropriate data packets, or portions thereof, during transmission. Fourth, clock cycle-intensive operations (e.g., computations) are offloaded to the hardware accelerators to reduce the load on the control processor. This has the further advantage of reducing the processing requirements on the control processor, which enables the operating clock rate of the control processor to be reduced. This facilitates use of a relatively low complexity control processor and can enable significant power savings and increases the feasibility of implementing the apparatus in an FPGA. The control processor need only update its outputs at the L1 minimum scheduling interval, which is 1 millisecond in the case of LTE but may be orders of magnitude shorter in newer standards such as 3GPP 5G NR. Still further, the L2 apparatus architecture provides flexibility of scaling based on complexity of processing. Since control processor can be relatively simple, the apparatus can include multiple cores and still be small and low power, as exemplified by the embodiment of FIG. 4. Further still, memory contention may be minimized by embodiments of the L2 apparatus as described. Finally, the combination of control processors and hardware accelerators enables the designer to explore important trade-offs. For example, a fully custom designed hardware block implementing a specific functionality may provide the best performance, but could be low in flexibility. On the other hand, implementing the functionality fully in the control processor may be best in terms of flexibility, but may result in lower system performance and/or require an extremel powerful control processor. However, in the embodiments described, the control processor performs a management role and the hardware accelerators are used to implement the computationally expensive aspects of the functionality, which may provide a desirable solution where both performance and flexibility are needed.

As described briefly above, in one embodiment the hardware accelerators have a defined API by which the control processor may send instructions to the hardware accelerators to perform operations. The function call example shown below in Table 1 may be compiled and run on the control processor to access one or more of the hardware accelerators.

TABLE 1

```
static inline void func_generate_header(unsigned* header_data,
   unsigned* bit_pos, unsigned memory_ind,
   unsigned header_num_elem) {
   // initialize IP block
   putfslx(INSTR_HDR_GEN_START, AXI_HDR_GEN_IF_ NUM,
FSL_DEFAULT);
   // write header information
   int i;
   for (i = 0; i < header_num_elem; i++) {
      putfslx(*(bit_pos+i), AXI_HDR_GEN_IF_NUM,
         FSL_DEFAULT);
      putfslx(header_data[i], AXI_HDR_GEN_IF_NUM,
         FSL_DEFAULT);
   }
   // store header in memory
   putfslx(INSTR_HDR_GEN_MEM, AXI_HDR_GEN_IF_NUM,
FSL_DEFAULT);
   putfslx(memory_ind, AXI_HDR_GEN_IF_NUM, FSL_DEFAULT);
   putfslx(header_data [header_num_elem], AXI_HDR_GEN_IF_NUM,
      FSL_DEFAULT);
}
```

Table 2 shown an example header structure definition, corresponding variable definitions and instructions to trigger the hardware accelerator operation, followed by an example function call executed by the control processor.

TABLE 2

```
// RLC header information
const unsigned RLC_HDR_INFO_NUM=4;
struct RLC_HDR_INFO_S {
   unsigned SF; // segmentation flag - 1 bit
   unsigned LSF; // last segment flag - 1 bit
   unsigned SN; // sequence number - 18 bit
   unsigned SO; // segment offsetfield - 16 bit
   unsigned mem_addr_u32; // memory address in header buffer
};
// RLC message headers
struct RLC_HDR_INFO_S rlc_hdr_config[hdr_buffer_size];
struct RLC_HDR_INFO_S rlc_hdr_bit_pos = {1,5,6,24};// from spec
// define hardware accelerator instructions
#define INSTR_HDR_GEN_START 0xA0A0A0A0
#define INSTR_HDR_GEN_MEM 0xAAAAAAAA
#define INSTR_TBA_START 0xA0A0A0A0
#define INSTR_TBA_NEW_DATA 0xAAAAAAAA
#define INSTR_TBA_END 0xA5A5A5A5
// generate RLC header
func_generate_header((unsigned*)&rlc_hdr_config[rlc_hdr_gen_cnt],
   (unsigned*) &rlc_hdr_bit_pos,
   RLC_HDR_MEM_IND,
   RLC_HDR_INFO_NUM);
```

As briefly described above, in one embodiment the hardware accelerators are generic in that they all have the same API. In one embodiment, the generic hardware accelerator may be implemented as a LabVIEW FPGA and defined as a single virtual instrument.

It is noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the new L2 architecture described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. An apparatus for use in performing wireless communications, comprising:
   at least one memory unit;
   a first data source/sink that sources/sinks packet data convergence protocol (PDCP) service data units (SDU) for transfer to/from the memory unit;
   a second data source/sink that sources/sinks media access control (MAC) protocol data units (PDU) for transfer to/from the memory unit;
   a plurality of hardware accelerators coupled to the memory unit;
   a control processor that controls the plurality of hardware accelerators;
   wherein in response to the first data source sourcing one or more transmit PDCP SDU for transfer to the memory unit, the control processor controls the plurality of hardware accelerators to:
      generate and write PDCP, radio link control (RLC), and MAC headers to the memory unit; and
      assemble the generated PDCP, RLC and MAC headers and the one or more transmit PDCP SDU from the memory unit into one or more transmit MAC PDU for provision to the second data sink; and
   wherein in response to the second data source sourcing one or more receive MAC PDU for transfer to the memory unit, the control processor controls the plurality of hardware accelerators to:
      decode PDCP, RLC and MAC headers of the one or more receive MAC PDU in the memory unit to determine locations of one or more receive PDCP SDU in the memory unit; and
      fetch the one or more receive PDCP SDU from the determined locations in the memory unit for provision to the first data sink.

2. The apparatus of claim 1,
   wherein the control processor is uncoupled from the at least one memory unit that holds the PDCP SDU.

3. The apparatus of claim 1,
   wherein the control processor controls the plurality of hardware accelerators without reading/writing PDCP SDU from/to the memory unit.

4. The apparatus of claim 1,
   wherein the control processor provides to the plurality of hardware accelerators pointers to locations of the memory unit from which the plurality of hardware accelerators assemble the one or more transmit MAC PDU and fetch the one or more receive PDCP SDU.

5. The apparatus of claim 1,
   wherein the control processor receives from the plurality of hardware accelerators pointers to locations of the memory unit of the one or more receive PDCP SDU in response to the decode of the headers of the one or more receive MAC PDU.

6. The apparatus of claim 1,
   wherein the control processor provides to the plurality of hardware accelerators information used by the plurality of hardware accelerators to generate the headers.

7. The apparatus of claim 1,
   wherein the control processor and the plurality of hardware accelerators communicate regarding locations of the memory unit to which the plurality of hardware accelerators write the generated headers.

8. The apparatus of claim 1, further comprising:
   a second memory, coupled to the control processor and uncoupled from the plurality of hardware accelerators that holds code executed by the control processor to perform PDCP, RLC and MAC sub-layer procedures.

9. The apparatus of claim 1,
   wherein the PDCP SDU comprise internet protocol (IP) packets; and
   wherein the MAC PDU comprise PHY transport blocks (TB).

10. The apparatus of claim 1,
    wherein the plurality of hardware accelerators comprise a common programming interface programmable by the control processor.

11. The apparatus of claim 1,
    wherein the control processor comprises a plurality of interfaces respectively coupled to the plurality of hardware accelerators to control the plurality of hardware accelerators.

12. The apparatus of claim 1,
    wherein the one or more memory units comprises:
       a first memory unit that receives the PDCP SDU sourced from the first data source; and
       a second memory unit that receives the MAC PDU sourced from the second data source.

13. The apparatus of claim 1,
    wherein the control processor controls the plurality of hardware accelerators by performing pointer manipulations to perform one or more of the following without itself reading/writing the PDCP SDU from/to the memory unit:
       packet retransmission window management;
       packet segmentation;
       packet concatenation; and
       packet discard.

14. The apparatus of claim 1,
    wherein the wireless communications are according to at least one of the following list of wireless communication standards defined by the 3rd Generation Partnership Project (3GPP) and Institute of Electrical and Electronics Engineers (IEEE):
       3GPP Long Term Evolution (LTE);
       3GPP LTE-Advanced;
       3GPP LTE-Advanced Pro;
       3GPP New Radio (NR); and
       IEEE 802.11.

15. The apparatus of claim 1,
wherein the control processor comprises a plurality of control processors coupled to respective ones of the plurality of hardware accelerators for control thereof.

16. A method for use in performing wireless communications by an apparatus having at least one memory unit, a plurality of hardware accelerators coupled to the memory unit, and a control processor, the method comprising:
sourcing/sinking packet data convergence protocol (PDCP) service data units (SDU) for transfer to/from the memory unit;
sourcing/sinking media access control (MAC) protocol data units (PDU) for transfer to/from the memory unit;
controlling, by the control processor in response to the first data source sourcing one or more transmit PDCP SDU for transfer to the memory unit, the plurality of hardware accelerators to:
  generate and write PDCP, radio link control (RLC), and MAC headers to the memory unit; and
  assemble the generated PDCP, RLC and MAC headers and the one or more transmit PDCP SDU from the memory unit into one or more transmit MAC PDU for provision to the second data sink; and
controlling, by the control processor in response to the second data source sourcing one or more receive MAC PDU for transfer to the memory unit, the plurality of hardware accelerators to:
  decode PDCP, RLC and MAC headers of the one or more receive MAC PDU in the memory unit to determine locations of one or more receive PDCP SDU in the memory unit; and
  fetch the one or more receive PDCP SDU from the determined locations in the memory unit for provision to the first data sink.

17. The method of claim 16,
providing, by the control processor, to the plurality of hardware accelerators pointers to locations of the memory unit from which the plurality of hardware accelerators assemble the one or more transmit MAC PDU and fetch the one or more receive PDCP SDU.

18. The method of claim 16,
receiving, by the control processor, from the plurality of hardware accelerators pointers to locations of the memory unit of the one or more receive PDCP SDU in response to the decode of the headers of the one or more receive MAC PDU.

19. The method of claim 16,
providing, by the control processor, to the plurality of hardware accelerators information used by the plurality of hardware accelerators to generate the headers.

20. The method of claim 16,
communicating, by the control processor and the plurality of hardware accelerators, regarding locations of the memory unit to which the plurality of hardware accelerators write the generated headers.

21. The method of claim 16,
wherein the PDCP SDU comprise internet protocol (IP) packets; and
wherein the MAC PDU comprise PHY transport blocks (TB).

22. A non-transitory computer-readable medium having instructions stored thereon that are capable of causing or configuring a wireless communication computing system having at least one memory unit, a plurality of hardware accelerators coupled to the memory unit, and a control processor to perform operations comprising:
sourcing/sinking packet data convergence protocol (PDCP) service data units (SDU) for transfer to/from the memory unit;
sourcing/sinking media access control (MAC) protocol data units (PDU) for transfer to/from the memory unit;
controlling, by the control processor in response to the first data source sourcing one or more transmit PDCP SDU for transfer to the memory unit, the plurality of hardware accelerators to:
  generate and write PDCP, radio link control (RLC), and MAC headers to the memory unit; and
  assemble the generated PDCP, RLC and MAC headers and the one or more transmit PDCP SDU from the memory unit into one or more transmit MAC PDU for provision to the second data sink; and
controlling, by the control processor in response to the second data source sourcing one or more receive MAC PDU for transfer to the memory unit, the plurality of hardware accelerators to:
  decode PDCP, RLC and MAC headers of the one or more receive MAC PDU in the memory unit to determine locations of one or more receive PDCP SDU in the memory unit; and
  fetch the one or more receive PDCP SDU from the determined locations in the memory unit for provision to the first data sink.

* * * * *